Patented May 10, 1932

1,857,264

UNITED STATES PATENT OFFICE

NORBERT STEIGER, OF FRANKFORT-ON-THE-MAIN, GERMANY, ASSIGNOR TO GENERAL ANILINE WORKS, INC., OF NEW YORK, N. Y., A CORPORATION OF DELAWARE

NEW DYESTUFF OF THE THIONAPHTHENE-INDIGO SERIES

No Drawing. Application filed September 27, 1930, Serial No. 484,932, and in Germany October 11, 1929.

My invention relates to a new dyestuff of the thio-naphthene-indole-indigo series corresponding probably to the formula:

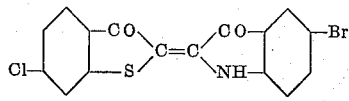

This dyestuff is obtained by condensing 6-chloro-3-hydroxy-thionaphthene with a reactive alphaderivative of 5-bromo-isatin, for instance, the alpha-chloride or alpha-arylides.

The dyestuff of my invention dyes vegetable and animal fibers grey shades. It fixes very well when printed on cotton and yields prints fast to light and exposure. It may therefore advantageously be used for printing awnings which, as is known, need an extremely good fastness to light and exposure. For this purpose the dyestuff of my invention surpasses the grey commercial vat dyestuffs hitherto known since the fast grey vat dyestuffs of the anthraquinone series are known to be less satisfactorily fixed in printing.

In comparison with the dyestuff obtained by introducing one atom of bromine into the condensation product from 3-hydroxythionaphthene and isatin-alpha-anil, which dyestuff is described in U. S. Patent 954,273, the present dyestuff is distinguished by a better fastness to exposure and light.

These good properties are the more surprising since the corresponding dyestuff containing chlorine, obtainable by condensing 6-chloro-3-hydroxy-thionaphthene and a reactive alphaderivative of 5-chloro-isatin, dyes cotton violet shades which do not turn to grey even when soaped violently for some hours. Such a fundamental difference between dyestuffs of this class containing chlorine and bromine respectively has not been established hitherto.

In order to further illustrate my invention the following examples are given, the parts being by weight and all temperatures in centigrade degrees. But I wish it to be understood that I am not limited to the particular conditions nor specific products mentioned therein.

*Example 1.*—57,5 parts of 5-bromoisatin are mixed with 58,5 parts of phosphorous pentachloride and about 600 parts of chlorobenzene and the mixture is heated for some hours while stirring at about 100° C. until complete solution has occurred. To this solution at about 80–100° C. a solution of 49 parts of 6-chloro-3-hydroxy-thionaphthene in about 600 parts of chlorobenzene is added. After stirring for a short time the dyestuff formed separates in violet crystals. Advantageously stirring is continued for some hours at about 80° C. Then the precipitate is filtered off, washed with chlorobenzene and dried. The 6-chloro-2-thionaphthene-5'-bromo-2-indole-indigo thus formed is a violet powder soluble in concentrated sulfuric acid with a dark green color and yields a light yellow hydrosulfite vat from which the vegetable and animal fibers are dyed grey shades.

*Example 2.*—37 parts of 6-chloro-3-hydroxythionaphthene are mixed with 76 parts of 5-bromisatin-p-bromo anilide and about 300 parts of nitrobenzene and the mixture is heated while stirring at about 150° C. for about 5 hours, then the mass is cooled down to about 30° C. and the separated dyestuff is filtered off and dried. It is practically identical with that of Example 1.

I claim:—

As a new compound the dyestuff of the thionaphthene-indole-indigo series corresponding probably to the formula:

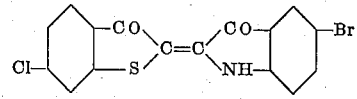

which dyestuff is when dry a violet powder soluble in concentrated sulfuric acid with a dark green color and yields a light yellow hydrosulfite vat from which the vegetable and animal fibers are dyed grey shades.

In testimony whereof, I affix my signature.

NORBERT STEIGER.